…

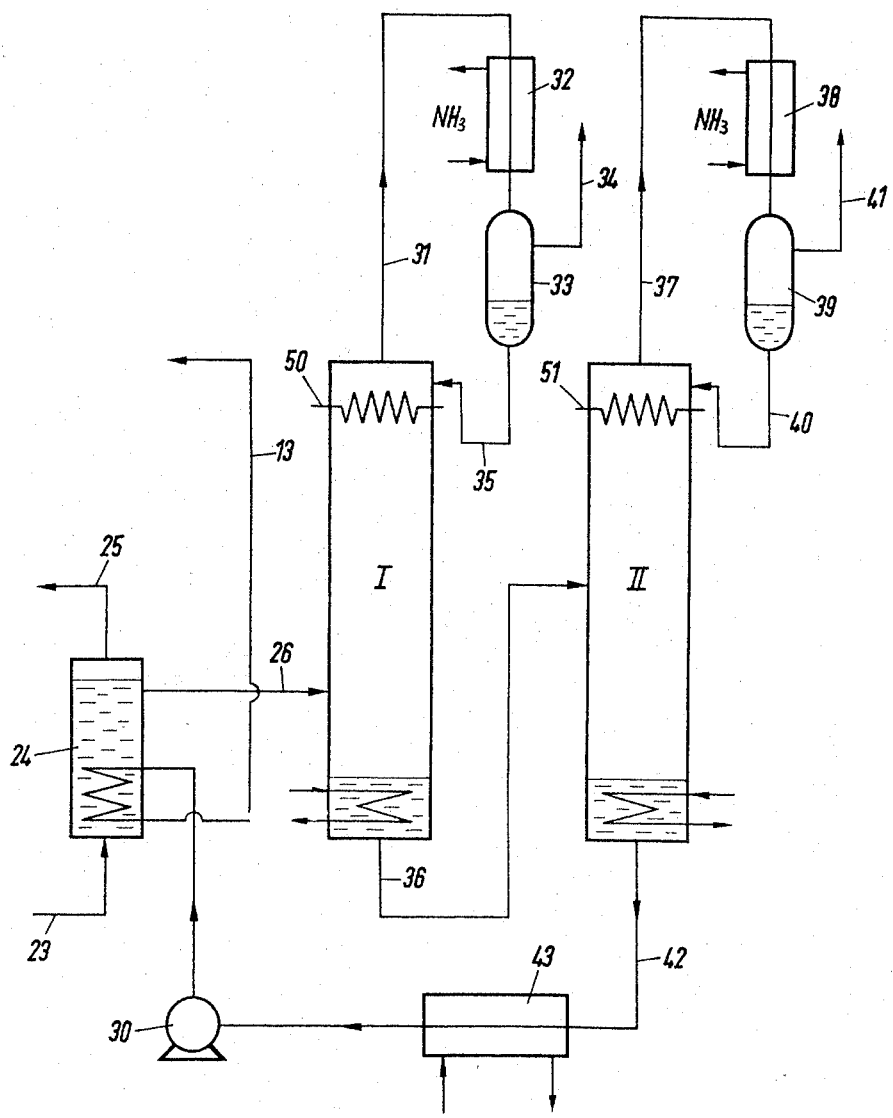

United States Patent Office 3,279,152
Patented Oct. 18, 1966

3,279,152
PROCESS FOR OBTAINING PURE ACETYLENE FROM A SOLUTION CONTAINING A SOLVENT AND C₂ HYDROCARBONS
Friedrich Rottmayr, Pullach, Isartal, near Munich, Germany, assignor to Linde Aktiengesellschaft
Filed Oct. 4, 1962, Ser. No. 228,381
Claims priority, application Germany Oct. 12, 1961, G 33,317
8 Claims. (Cl. 55—43)

This application is a continuation-in-part of my co-pending application Ser. No. 858,953, now U.S. Patent No. 3,087,310, filed December 11, 1959 which, in turn, is a continuation-in-part of application Ser. No. 580,327, now abandoned, filed April 24, 1956.

This invention relates to a process for the recovery of relatively pure acetylene from a solution containing acetylene, ethylene and in some cases ethane, all dissolved in a liquid gas absorbent. The gas absorbent is preferably acetone.

In a process described in German Patent 953,700, acetylene is removed from a hydrocarbon mixture containing not only acetylene but also ethylene with or without ethane, by washing the mixture at a low temperature with a solvent such as acetone. This washing process synonymously defined as gas absorption or scrubbing, can be conducted between the methane column and the ethylene column. The mixture which is subjected to the acetone washing process is ethylene, ethane and acetylene. Alternatively, the washing process can be conducted after the separation of the ethane in the ethylene column. The overhead products from the ethylene column, consisting of only ethylene and acetylene, can then be subjected to washing with acetone.

In the German Patent No. 953,700 process, the acetone enriched with acetylene is regenerated in a special rectifying column in which the acetylene-containing gas analyzing 50 to 90% acetylene, (the specific value being a function of the composition of the gaseous mixture being washed) escapes as overhead vapor. The other 10–50% portion of the escaped gases consists of a mixture of ethylene and ethane if the acetone washing is conducted immediately after passage through the methane column. On the other hand, if the acetone washing is not conducted until after the separation of the ethane in the ethylene column, then the gas from the regeneration column consists of only acetylene and ethylene. These overhead gaseous fractions have heretofore been burned as waste.

The principal object of this invention is to obtain relatively pure acetylene as a valuable by-product during the regeneration of the solvent employed to remove acetylene from an ethylene-containing gas.

Other objects and advantages of the invention will become apparent upon a further study of the specification and appended claims.

The objects of the invention are achieved by a 2-stage process of first heating the solvent containing ethylene and acetylene or ethylene, acetylene and ethane to effect the complete stripping of the ethylene and whatever ethane may be present, and then further heating the residual solvent containing only acetylene in a second regeneration step to drive off the acetylene.

Such a process is illustrated in the accompanying drawing which is a schematic flowsheet depicting a preferred specific embodiment of the invention.

Referring now to the drawing in detail, loaded acetone 23 from the wash column and containing dissolved acetylene and ethylene, or ethylene, acetylene and ethane if the acetone wash was conducted from passage of the C₂ fraction through the ethylene column, is delivered to the stripper 24 in which the bulk liquid contents are maintained at a temperature of −32° C. and an absolute pressure of 1.8 at. By virtue of these operating conditions, and after a residence time of about 15 minutes, the loaded acetone is substantially stripped of ethylene and of ethane if present. This evolved gas is then recycled through the conduit 25 to the bottom of the washing column.

The acetone, which still contains the acetylene and some residual ethylene and perhaps also ethane, is then delivered through the conduit 26 to the regenerator column I. Column I has about 10 theoretical plates under a superatmospheric pressure of 1.5 atmosphere absolute. The sump of column I may be steam heated sufficiently to make the partial pressures of the acetone and the acetylene equal to the gas pressure in the column. By maintaining this temperature of −20° C., the residual ethylene with whatever ethane may be present and with any acetone vapor that has not been condensed by water cooler 50 will escape through the conduit 31, while the acetylene still remains in solution. The products from the top of the column I are cooled, as for instance, by means of a refrigerant such as ammonia in the cooler 32 to condense the remaining acetone which then collects in the bottom of the separator 33. The material that still remains gaseous is removed through the conduit 34, and the condensed acetone is returned by line 35 to the upper end of column I.

If the washing process were conducted between the methane and ethylene column, then a mixture of ethylene and ethane would escape through the conduit 34, which would then be delivered to the ethylene column and would there be separated into its components. Alternatively, if the ethane were already removed prior to washing with acetone, then pure ethylene can be obtained from the conduit 34.

The material collected in the bottom of column I, which is a solution of acetylene and acetone, is withdrawn through a conduit 36 and is fed into column II, having about 10 theoretical plates and operating at 56° C., and 1.3 atmosphere absolute. The material in the bottom thereof is boiled off and the acetylene driven off through the conduit 37. The acetone which does not condense in the water cooler 51, is condensed in the cooler 38, separated from gaseous acetylene in the separator 39, and is then returned through the conduit 40 to column II. Pure gaseous acetylene is removed through conduit 41.

From the sump of column II, pure acetone is delivered through conduit 42 to the water cooler 43 and is delivered from there to the pump 30, from where it passes through the heat exchanger 24 and is returned through conduit 13 to the acetone washing column.

It is to be appreciated that in the preferred embodiment of the invention, there is employed three steps, the first step functioning to strip out the major amount of the ethylene and ethane, the second step to eliminate the residual ethylene and ethane by boiling the acetone solution, and the third step to again boil the acetone to simultaneously strip out pure acetylene gas and obtain regenerated acetone.

In general the loaded acetone delivered to the stripper 24 from the scrubber (washing column or absorption tower), has the following composition, the "A" column designating a washing operation before the fractionation of ethane as shown by column 102 of FIGS. 3 and 4 in U.S. Patent No. 3,087,310, and the "B" column after the fractionation of ethane as shown by column 12 of FIGS. 1 and 2 in U.S. Patent No. 3,087,310.

[Mols of Gas per 100 kg. of Acetone]

| Components | A | B |
|---|---|---|
| Ethylene | 200–900 | 200–900 |
| Acetylene | 50–1,400 | 50–1,400 |
| Ethane | 50–200 | |

In the first step of the process, the temperature and pressure conditions are about −40 to +200° C. and 1–20 atmospheres absolute, respectively. In this way about 85 mol percent of the ethylene and mol percent of the ethane, is present are stripped (desorbed).

In the second step the remaining ethylene and ethane is eliminated in a distillation column which is operated at about −20° C. to +120° C. and 1.5–6 atmosphere absolute.

Here, it should be noted that it is theoretically possible to eliminate all the ethylene and ethane in a first step, but it is much preferred to use first a heating step without boiling of the acetone, and then a second step of heating the acetone, the advantage of this type of operation being the possibility of regaining a maximum part of the energy necessary for cooling the acetone and removing the heat of solution of ethylene and ethane in acetone. A further advantage is that the heat exchanger of the first step which must be maintained at a lower temperature, is small and of simple construction, and avoids losses of energy caused by insufficient insulation.

The third step of the process is conducted in a distillation column operating at about 56° C. and 1.1 atmosphere absolute, thereby obtaining pure gaseous acetylene and pure acetone.

In addition to acetone, other solvents boiling above 0° C. and melting below −50 to −90° C. can be employed in this invention, such as methanol, dimethylformamide, lower esters of organic acids and pyrrolidone.

The process of this invention is of special importance where relatively small quantities of pure acetylene can be beneficially utilized, as for example in the production of halogenated hydrocarbons and glycols and in using it as a welding gas.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for recovering pure acetylene from a solution comprising:
   (a) stripping by heating said solution comprising a high boiling solvent, acetylene, ethylene and ethane to a temperature of −40 to +200° C. under 1–20 atmospheres absolute pressure and removing a major portion of the ethylene and ethane;
   (b) fractionally distilling the stripped solution of (a) to remove the residual ethylene and ethane as overhead and to recover a bottom product of high boiling solvent and acetylene; and
   (c) fractionally distilling the bottom product of (b) to recover pure high boiling solvent and pure gaseous acetylene.

2. A process for recovering pure acetylene from a solution comprising:
   (a) stripping by heating said solution comprising a high boiling solvent, acetylene and ethylene to a temperature of −40 to +200° C. under 1–20 atmospheres absolute pressure and removing a major portion of the ethylene;
   (b) fractionally distilling the stripped solution of (a) to remove the residual ethylene as overhead and to recover a bottom product of high boiling solvent and acetylene; and
   (c) fractionally distilling the bottom product of (b) to recover pure high boiling solvent and pure gaseous acetylene.

3. The process of claim 1, wherein said high boiling solvent is acetone.

4. The process of claim 2, wherein said high boiling solvent is acetone.

5. A process for recovering pure acetylene from a solution comprising;
   (a) stripping by heating said solution comprising a high boiling solvent from the group consisting of acetone, methanol, dimethylformamide and pyrrolidone with acetylene, ethylene and ethane to a temperature of −40 to +200° C. under 1–20 atmospheres absolute pressure, and removing a major portion of the ethylene and ethane;
   (b) fractionally distilling the stripped solution of (a) to remove the residual ethylene and ethane as overhead and to recover a bottom product of high boiling solvent and acetylene; and
   (c) fractionally distilling the bottom product of (b) to recover pure high boiling solvent and pure gaseous acetylene.

6. A process for recovering pure acetylene from a solution comprising;
   (a) stripping by heating said solution comprising a high boiling solvent from the group consisting of acetone, methanol, dimethylformamide and pyrrolidone with acetylene and ethylene to a temperature of −40 to +200° C. under 1–20 atmospheres absolute pressure, and removing a major portion of the ethylene;
   (b) fractionally distilling the stripped solution of (a) to remove the residual ethylene as overhead and to recover a bottom product of high boiling solvent and acetylene; and
   (c) fractionally distilling the bottom product of (b) to recover pure high boiling solvent and pure gaseous acetylene.

7. The process of claim 5, wherein said high boiling solvent is acetone.

8. The process of claim 6, wherein said high boiling solvent is acetone.

References Cited by the Examiner

UNITED STATES PATENTS

| | | | |
|---|---|---|---|
| 2,146,448 | 2/1939 | Scott et al. | 55—65 |
| 2,719,601 | 10/1955 | Bartholome et al. | 55—64 |
| 2,809,710 | 10/1957 | Hachmuth | 55—65 |
| 2,937,714 | 5/1960 | Braconier et al. | 55—64 |
| 3,004,629 | 10/1961 | Cottle | 55—64 |
| 3,026,969 | 3/1962 | Braconier et al. | 55—42 |
| 3,087,310 | 4/1963 | Rottmayr | 55—64 |
| 3,098,107 | 7/1963 | Becker | 55—64 |

REUBEN FRIEDMAN, *Primary Examiner.*

B. NOZICK, *Assistant Examiner.*